No. 775,503.

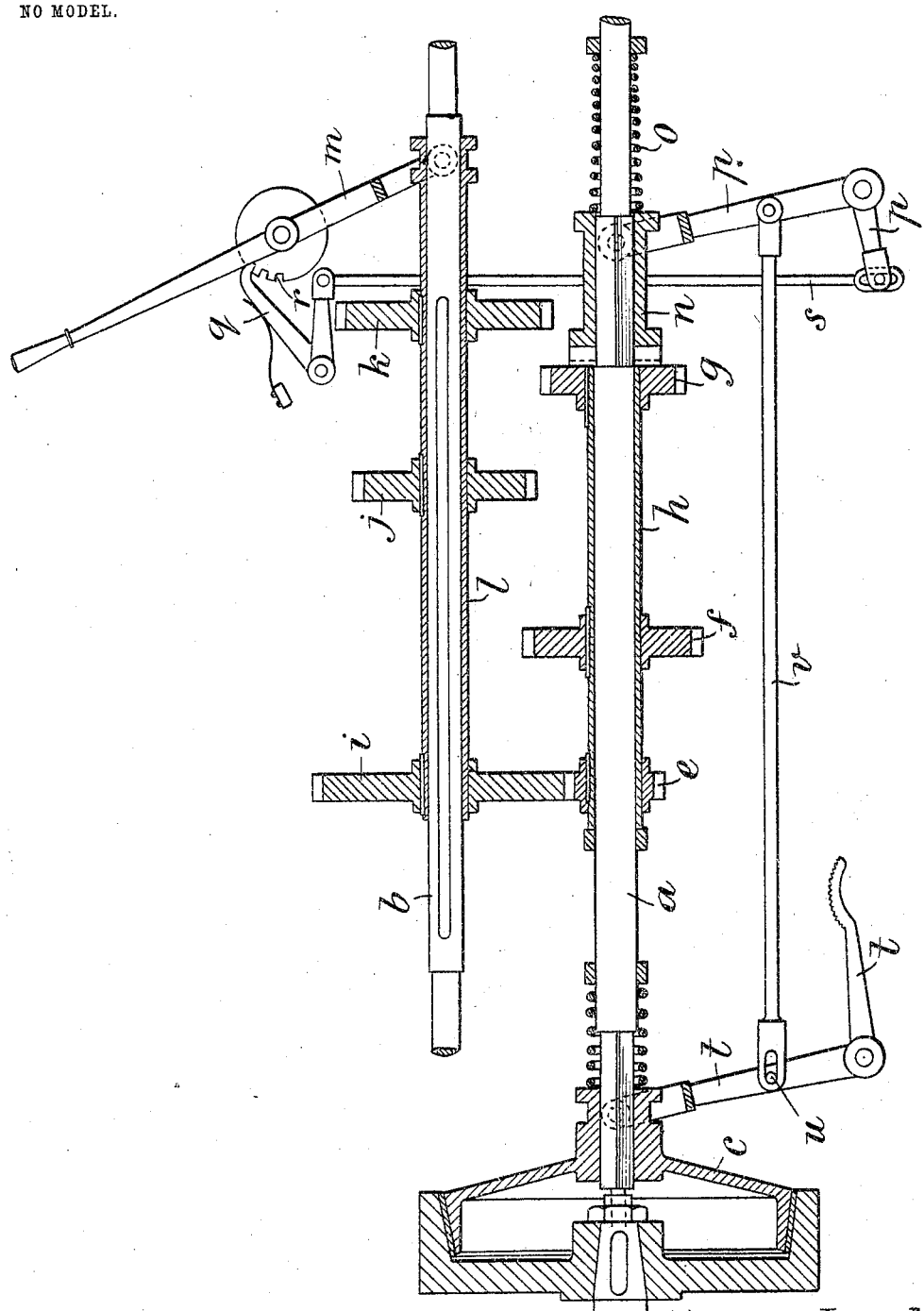

Patented November 22, 1904.

UNITED STATES PATENT OFFICE.

ALFRED SOAMES AND WALTER LANGDON-DAVIES, OF THE COUNTY OF SURREY, ENGLAND.

CHANGE-SPEED GEAR.

SPECIFICATION forming part of Letters Patent No. 775,503, dated November 22, 1904.

Application filed January 18, 1904. Serial No. 189,616. (No model.)

*To all whom it may concern:*

Be it known that we, ALFRED SOAMES and WALTER LANGDON-DAVIES, engineers, subjects of the King of Great Britain, both residing at 101 Southwark street, in the county of Surrey, England, have invented certain new and useful Improvements in Change-Speed Gear, of which the following is a specification.

Our improvements relate to change-speed gear in which two shafts are used, one of which can be driven from the other at varying speeds by any one or other of a number of gear-wheels on one shaft being used to drive a wheel on the other according to the speed required and in which when a change in the speed of driving is to be effected a wheel on one shaft which previously was in mesh with a wheel on the other shaft is slid endwise along its shaft to put out of mesh and another wheel is similarly slid endwise to bring it into mesh with another wheel.

According to this invention we not only employ, as heretofore, a main friction-clutch, through which one of these shafts receives motion from a motor-shaft, but also employ in addition a positive interlocking clutch by which that shaft can be entirely put out of connection with all parts of the friction-clutch at the time when any wheel is to be put into or out of mesh with another. For shifting the clutches we use a pedal-lever. The first movement of the pedal-lever we cause to disengage the friction-clutch, and a further movement of the pedal-lever in the same direction we cause to disengage the positive clutch, and until both these movements have been completed no fresh selection of driving speed can be effected. On the return movement of the pedal the positive clutch may first become engaged and subsequently the friction-clutch. Thus when a fresh selection of driving speed is being made and a fresh pair of wheels brought into engagement it is only the wheels themselves and one-half of the positive clutch that have their speed increased or decreased, and as the positive clutch can be made of much less size and weight than the friction-clutch the shock arising from bringing a fresh pair of wheels into action is reduced to a minimum and the change from one speed of driving to another can be effected much more quietly than heretofore. In addition we provide means for insuring that no shifting of the wheels to put them into or out of mesh can take place except at the time when the positive clutch is disengaged.

The drawing annexed shows a diagrammatic view of change-speed gear arranged in the above manner.

$a$ and $b$ are the two shafts of the change-speed gear. The shaft $a$ can be driven through a friction-clutch $c$ from a shaft $d$, driven by a motor.

$e\ f\ g$ are three gear-wheels on a sleeve $h$, which can turn freely on the shaft $a$.

$i\ j\ k$ are three wheels on a sleeve $l$, which can be moved endwise along the shaft $b$, but which turns with it.

$m$ is a lever by which the sleeve $l$ can be slid endwise, so as either to bring the wheel $i$ into gear with the wheel $e$, or $j$ into gear with $f$, or $k$ into gear with $g$.

$n$ is a sliding positive interlocking clutch by which the shaft $a$ can be locked to the sleeve $h$.

$o$ is a spring for pressing the sleeve into position for locking the sleeve.

$p$ is a lever by which the positive clutch $n$ can be drawn back into its disengaged position.

$q$ is a lever-catch by which the lever $m$ is normally locked in one or other of its positions, the end of the catch then entering one or other of a series of notches $r$ in a boss which is fast with the lever.

$s$ is a connecting-rod coupling the lever-catch to an arm on the lever $p$.

$t$ is a pedal-lever by which the endwise-movable portion of the friction-clutch $c$ can be drawn back and disengaged from the other portion of the clutch which is on the shaft $d$.

$u$ is a pin projecting from the lever $t$ and passing into a slot in one end of a connecting-rod $v$, which at its other end is coupled to the lever $p$.

When the pedal is depressed, the friction-clutch $c$ is first disengaged and then the positive clutch $n$, and, lastly, the catch $q$ is drawn back. The lever $m$ can then be shifted to select which pair of wheels shall next be brought into action. When the pedal-lever is allowed to move back to its original position, the positive clutch $n$ may first engage and afterward the friction-clutch.

What we claim is—

1. In change-speed gear the combination of two shafts, gear-wheels of varying diameter on each, each wheel on one adapted to mesh with a wheel on the other and one wheel of each intermeshing pair capable of being slid along its shaft to put it into or out of mesh with the other wheel of the pair, a friction-clutch, a positive clutch driven by the friction-clutch and itself driving one of the shafts, a selective lever by the movement of which any pair of wheels can be brought into mesh, a pedal-lever, mechanism by which the first movement of this lever disengages the friction-clutch, mechanism by which the further movement of this lever disengages the positive clutch and locking mechanism by which the selecting-lever cannot be shifted unless the positive clutch has first been disengaged.

2. In change-speed gear, the combination of two shafts, gear-wheels of varying diameters on said shafts adapted to intermesh, a friction-clutch, a positive clutch driven by the friction-clutch and itself driving one of the shafts, a selective lever by the movement of which any pair of wheels can be brought into mesh, a pedal-lever, mechanism by which the first movement of this lever disengages the friction-clutch, mechanism by which the further movement of this lever disengages the positive clutch and locking mechanism by which the selecting-lever cannot be shifted unless the positive clutch has first been disengaged.

3. In change-speed gear the combination of two shafts, gear-wheels of varying diameter on each, each wheel on one adapted to mesh with a wheel on the other and one wheel of each intermeshing pair capable of being slid along its shaft to put it into or out of mesh with the other wheel of the pair, a friction-clutch, a positive clutch driven by the friction-clutch and itself driving one of the shafts, a selective lever by the movement of which any pair of wheels can be brought into mesh, a pedal-lever, mechanism by which the first movement of this lever disengages the friction-clutch, and mechanism by which the further movement of this lever disengages the positive clutch.

4. In change-speed gear, the combination of two shafts, gear-wheels of varying diameters on said shafts adapted to intermesh, a friction-clutch, a positive clutch driven by the friction-clutch and itself driving one of the shafts, a selective lever by the movement of which any pair of wheels can be brought into mesh, a pedal-lever, mechanism by which the first movement of this lever disengages the friction-clutch, and mechanism by which the further movement of this lever disengages the positive clutch.

ALFRED SOAMES.
WALTER LANGDON-DAVIES.

Witnesses:
ROBERT B. RANSFORD,
JOHN HENDERSON WHITEHEAD.